UNITED STATES PATENT OFFICE.

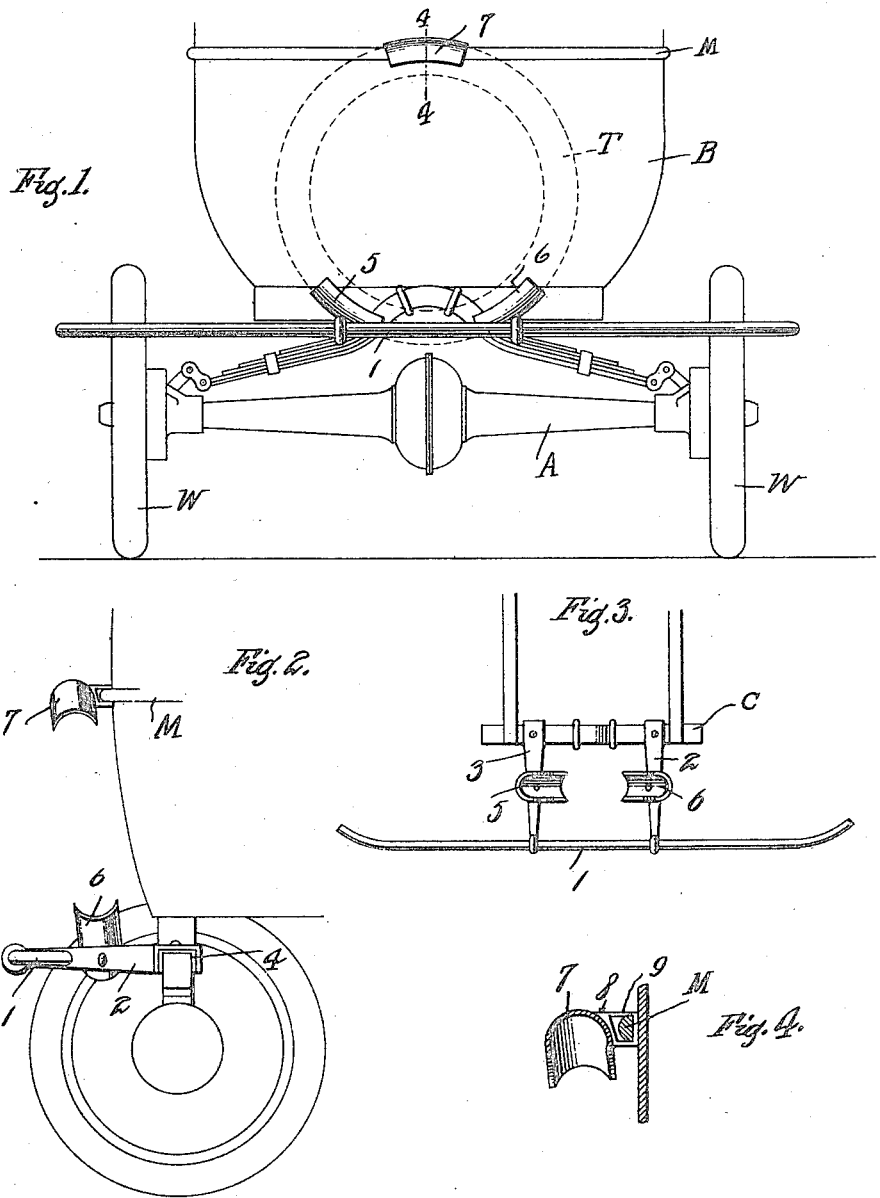

RUSSELL S. HARTZLER, OF TOPEKA, INDIANA.

COMBINED BUMPER AND TIRE-CARRIER.

1,254,404.  Specification of Letters Patent.  Patented Jan. 22, 1918.

Application filed January 16, 1917. Serial No. 142,700.

*To all whom it may concern:*

Be it known that I, RUSSELL S. HARTZLER, a citizen of the United States, residing at Topeka, in the county of Lagrange and State of Indiana, have invented certain new and useful Improvements in Combined Bumpers and Tire-Carriers, of which the following is a specification.

This invention relates to improvements in a combined rear end bumper and tire carrier for motor vehicles.

The main object of the invention is to provide a bumper for protecting the rear end of an automobile, the supporting structure of which also operates as a support for a carrier for one or more extra tires.

Another object is to provide a rigid carrier structure of light weight compared to its carrying capacity, and one which may be constructed at small expense.

In the accompanying drawings:—

Figure 1 represents a rear elevation of a car equipped with this invention,

Fig. 2 is a side elevation thereof, with the rear wheel removed,

Fig. 3 is a plan view of the bumper and its supports with the tire carrying elements mounted on said supports, Fig. 4 is a detail transverse section taken on the line 4—4 of Fig. 1.

In the embodiment illustrated a car is shown equipped with this improved combined rear end bumper and tire carrier, A representing the rear axle and W the rear wheels. The usual body B is shown having a molding M around the upper portion thereof.

The device constituting this invention comprises a bumper 1 in the form of a metal rod having laterally curved opposite ends, from which rod extend two lateral attaching arms 2 and 3. These arms 2 and 3 are spaced longitudinally from each other being fixed to the rod 1 in any suitable manner and preferably disposed near the middle of the rod as is shown clearly in Figs. 1 and 3. These arms 2 and 3 are provided at their free ends with inverted U shaped sockets 4 which are designed to fit over and bindingly engage the rear cross bar C of a chassis. These socket arms may be secured to said cross bar by set screws or other suitable detachable fastening means to adapt the device to be applied to different cars and to remove it when desired.

Mounted on the arms 2 and 3 are arcuate tire receiving members 5 and 6 which are curved to form seats corresponding in shape to the periphery of the tire to be mounted therein, the longitudinal curvature of said members 5 and 6 being in the direction as shown in Fig. 1 and said members being alined to receive a tire T shown in dotted lines. These members 5 and 6 may be riveted or otherwise suitably secured to arms 2 and 3, and while one member only is shown applied to each arm it is to be understood that more than one may be carried by each arm according to the number of extra tires it is desired carried.

A coöperating tire engaging member 7 is carried by the molding M around the upper portion of the car body projecting laterally therefrom and being secured thereto by means of a bracket 8 which is shown provided with an angular opening 9 through which molding M is passed and which operates to secure the member 7 to the car body. This member 7 is so arranged as to be in the same plane with the members 5 and 6, and spaced therefrom a distance substantially equal to the diameter of the tire T to be carried. These members 5, 6, and 7 serve as clamps for supporting the tire in position at the rear of the vehicle and are formed so as to be readily removed and applied. To prevent surreptitious removal of the tire any suitable locking means may be applied, but as they constitute no part of this invention it is not deemed necessary to show them.

From the above description it will be seen that the arms 2 and 3 not only form attaching means for the bumper 1 but operate also as supports for the carrier members 5 and 6 thus performing a double function.

From the foregoing description, taken in connection with the accompanying drawing, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim as my invention:—

The combination with a vehicle having a cross bar at its rear end, of a pair of rearwardly projecting laterally spaced arms having inverted U-shaped sockets at their inner ends to fit over said cross bars and rigidly secured thereto, arcuate tire receiving members curved to conform to the shape of the periphery of a tire and mounted on said arms, midway their ends with their open faces facing each other, a rod connecting the free ends of said arms with its ends extended and performing the double function of an arm connector and a rear end bumper, a bracket carried by the vehicle body in a plane above said arms and midway between them, a coöperating similarly shaped tire engaging member carried by said bracket and facing downwardly being positioned to engage the periphery of a tire seated in said first mentioned tire receiving members whereby the tire is securely clamped in position.

In testimony whereof I affix my signature in presence of two witnesses.

RUSSELL S. HARTZLER.

Witnesses:
M. E. HARTZLER,
W. C. TRAYER.